United States Patent

[11] 3,575,623

[72] Inventor Bradley K. Stine
    Xenia, Ohio
[21] Appl. No. 7,629
[22] Filed Feb. 2, 1970
[45] Patented Apr. 20, 1971
[73] Assignee General Motors Corporation
    Detroit, Mich.

[54] WINDING END TURN INSULATOR FOR A DYNAMOELECTRIC MACHINE
5 Claims, 8 Drawing Figs.

[52] U.S. Cl. .................................................. 310/260, 310/215
[51] Int. Cl. ..................................................... H02k 3/38
[50] Field of Search ........................................ 310/260, 270, 271, 214, 215

[56] References Cited
UNITED STATES PATENTS
3,219,857 11/1965 Fisher ............................ 310/215X
2,935,859 5/1960 Marvin ........................... 310/215X Primary Examiner—D. F. Duggan
Assistant Examiner—B. A. Reynolds
Attorneys—E. W. Christen, C. R. Meland and Robert W. Smith ABSTRACT: In a preferred form, a winding end turn insulator provides an insulating barrier between the end turns of two windings extending from the ends of a stator of a dynamoelectric machine. The insulator is formed of a flexible sheet insulation material and includes a body portion having integral locking tabs extending from one side thereof. The ends of the body portion are overlapped to form a circular collar capable of covering the inside diameter of one group of the end turns. The locking tabs extend radially and are engaged by an outer diameter of the end turns so that the body portion is held in place while the other winding is assembled to the stator.

PATENTED APR 20 1971 3,575,623

INVENTOR.
Bradley K. Stine
BY
Robert W. Smith
ATTORNEY

INVENTOR.
Bradley K. Stine
BY
Robert W. Smith
ATTORNEY

WINDING END TURN INSULATOR FOR A DYNAMOELECTRIC MACHINE

This invention relates to winding end turn insulators for dynamoelectric machines and more particularly to an improved insulator for separating radially overlapping end turns at the ends of a stator assembly and to an improved method of assembling a winding end turn insulator to a stator assembly and between the winding end turns.

In certain types of stator assemblies of dynamoelectric machines at least two filed windings are provided by coils wound in overlapping relationship in slots of a stator core. The portion of the coils extending from one slot to another along the ends of the stator core form the winding end turns. Accordingly, the end turns of one winding are radially disposed relative to the end turns of the other winding. When the field windings are energized by an electrical source, potential differences are developed between the two field windings. It is, therefore, normal practice to provide an insulating barrier between adjacent coils of the two windings.

In certain types of single-phase alternating current induction motors, overlapping coils are wound in the slots of a stator core to form a main or running winding and a starting or phase winding. Groups of wire conductors included in the coils are normally covered with a thin coating of varnish. To prevent arcing between conductors and insulation breakdown of the varnish coating due to the aforementioned potential differences, winding insulators made of a thin sheet of insulation material are provided within the slots and at the end turns to separate the windings.

One general type of winding insulator employed between the end turns of the above-mentioned induction motors includes an insulating barrier body portion having legs that are inserted in the stator slots. This type of insulator often includes two body portions which are interconnected by leg portions for insulating the end turns at opposite ends of a stator. The leg portions are mounted in the stator slots to attach and secure the body portions to the stator.

In a stator assembly employing the aforementioned type of winding insulator, a first field winding is assembled to the stator core and then separator insulators are installed to separate the second windings within the slots. The end turn insulator is then assembled to the stator by placing the leg portions within the slots. The second winding is assembled to the stator slots and the winding end turns formed thereby overlap the winding end turns of the first winding and are separated by the insulator body portions at each end of the stator.

The leg portions of these insulators must be assembled from within the stator core and occupy space in the stator slots. In addition to the separator insulator and the leg portions of the aforementioned end turn insulator, the stator slots also include an insulating liner and slot closing peg or wedge. Accordingly, the amount of available space in the slots for the groups of conductors forming the winding coils is reduced by the number and size of insulators required to be placed in the slots. The fewer conductors that can be placed in the slot space reduces the maximum efficiency permitted for a stator core of a given size.

In accordance with the present invention, a winding end turn insulator which provides an insulating barrier between the end turns of first and second windings is attached by integral locking tabs which are inserted between the end turns and the end of the stator. The end turn insulator includes a thin sheet of flexible insulation material forming an insulator body with the locking tabs extending from one side thereof. The ends of the insulator body are overlapped to form a circular collar that covers the inner radial sides of the end turns of the first winding. The locking tabs are bent at substantially right angles to the insulator body and then are inserted through a radial space between the end turns of the first winding and the end of the stator. The locking tabs secure the insulator body in place prior to assembly of the second winding. The ends of the insulator body are also fastened so that the shape of the collar formed thereby is maintained substantially rigid. The locking tabs are attached to one side of the insulator body by thin connecting strips which permit the locking tabs to bend radially and to be detached after final assembly of the windings to the stator core.

An object of this invention is to provide an improved winding end turn insulator for separating radially disposed end turns in which the end turn insulator is easily assembled and mounted solely outside of a stator core by integral locking tabs inserted between the winding end turns and the stator end.

Another object of this invention is to provide an end turn insulator for separating the end turns of two field windings of a stator core wherein the insulator includes a body portion having locking tabs extending from one edge thereof for radial placement between the end turns of one of the windings and the stator end and wherein the ends of the body portion are overlapping and interlocked to provide a rigid and securely fastened insulator assembly.

A further object of this invention is to provide a method of assembling an end turn insulator for separating the radially disposed end turns of first and second windings which are formed on a stator core and in which after the first winding is assembled to the stator core the end turn insulator is mounted over the inside diameter of the end turns of the first winding and secured in place by locking tabs which are inserted radially between the end turns of the first winding and the stator end prior to assembly of the second winding to the stator core.

A still further object of this invention is to provide a winding end turn insulator including a body portion having integral locking tabs for an induction motor having radially disposed main and phase field windings in which one of the field windings is disposed in the slots of a core member so as to leave vacant slots which are to receive the other of the windings so that a radial opening is provided at the ends of the vacant slots to permit the locking tabs to be inserted therethrough and, accordingly, the sides of the locking tabs are engaged by the outer conductors of the one winding to hold the insulator in place during assembly of the other winding to the stator core.

Further objects and advantages of this invention will become apparent from the following description, reference being had to the accompanying drawings wherein preferred embodiments of the present invention are shown.

IN THE DRAWINGS

Figure 1:
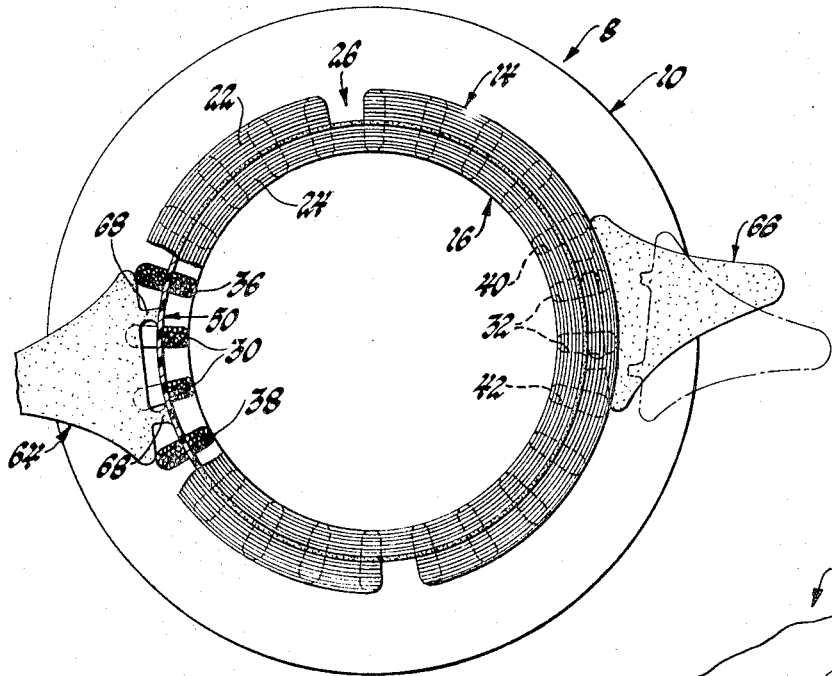
FIG. 1 is a partially sectioned, plan view of a stator assembly including an end turn insulator made in accordance with this invention.

Referring now to FIG. 1, there is shown a stator assembly 8 of a dynamoelectric machine. A stator core 10 of a type employed in single-phase alternating current induction motors is formed by a stack of laminations including a plurality of slot openings. The openings are aligned to form a plurality of axially extending and circumferentially-spaced slots 12 formed around the inner diameter of the stator core 10. The slots 12 receive a first or main field winding, generally designated by numeral 14, and a second or phase field winding, generally designated by numeral 16. The main and phase windings 14 and 16 are of the types utilized in single-phase induction motors of the split-phase, capacitor start type in which the phase winding 16 is used for motor starting or the permanent split capacitor type in which the phase winding 16 is used for motor starting and running.

Figure 3:
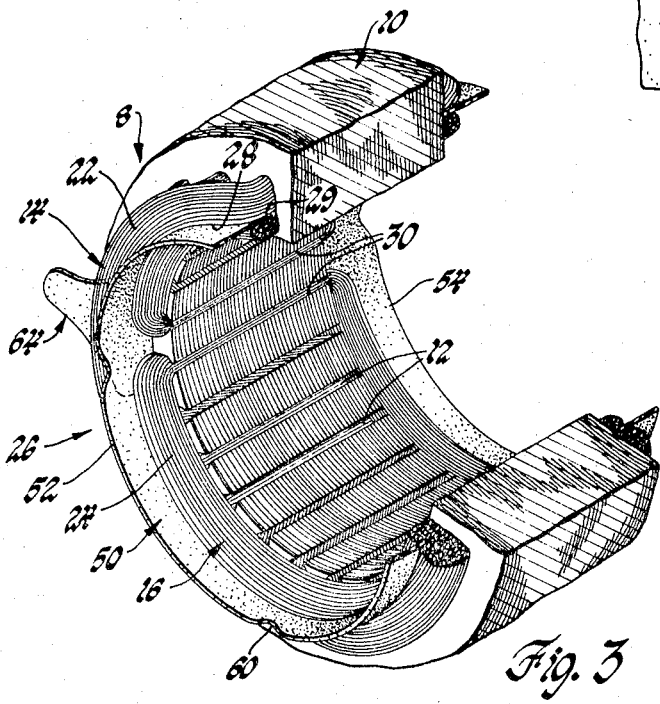
FIG. 3 is a perspective view with a portion broken away of the stator assembly of FIG. 1.

The main winding 14 and the phase winding 16 include groups of wire conductors which are formed into coils extending through the stator slots and between slots at the ends of the stator core 10. First and second groups of winding end turns 22 and 24, more clearly illustrated in FIG. 3, are formed by portions of windings 14 and 16, respectively, extending from the ends of the stator core 10. The end turns 22 and 24 are separated by a winding end turn insulator 26 made in accordance with the present invention and described in particular detail hereinbelow.

The groups of conductors forming the coils of the main winding 14 and the phase winding 16 are normally provided with a thin coating of insulating varnish. The two windings 14 and 16 are disposed in the stator core in radially adjacent relationship. High potential differences are developed between the two windings which can cause arcing or short circuiting conditions between the windings when they are energized. The end turn insulator 26 provides an insulating barrier between the inner radial sides or inner diameter 28 of the end turns 22 and the outer radial sides or outer diameter 29 of the end turns 24. This prevent arcing which can occur because of abrasions in the insulating varnish of adjacent coil conductors.

Two main field poles are formed in the stator core 10 by two groups of coils comprising the main winding 14. The coils are symmetrically disposed in slots on opposite sides of diametrically disposed pairs of slots designated 30 and 32, as illustrated in FIG. 1. Accordingly, the main field poles are oriented on the left and right sides of the stator core 10. The pairs of slots 30 and 32 receive coils of the phase winding 16 only. These coils are also symmetrically arranged in slots adjacent the upper and lower slots, respectively, of each pair of slots 30 and 32 so that some slots receive both the main and phase windings. Two-phase field poles are formed which are oriented at the top and bottom of the stator core 10. This 90° space quadrature orientation of the phase field poles with respect to the main poles is commonly employed in two-pole single-phase induction motors.

Figure 2:
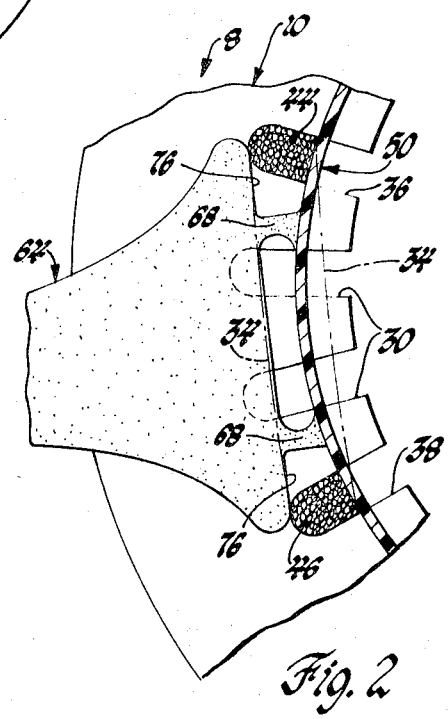
FIG. 2 is an enlarged fragmentary view illustrating disposition of the end turn insulator of this invention prior to assembly of a second winding to the stator assembly.

The end turns 22 of the main winding extend around the ends of the stator core and over the ends of the pairs of slots 30 and 32. These two pairs of slots are vacant prior to assembly of the phase winding 16 as illustrated in FIG. 2. One coil of the end turns 22 is outlined by a pair of phantom lines 34 shown in FIG. 2 in which the coil spans slots designated 36 and 38 adjacent opposite sides of the pair of slots 30. The end turn coil indicated by the phantom lines 34 includes a group of wire conductors defining slot entering conductors 44 at the end of slot 36, and slot exiting conductors 46 at the end of slot 38. A radial opening is provided axially between the coil end turn and the stator core 10 and is arcuately defined by the space between the entering and exiting conductors 44 and 46. A similar coil of the end turns 22 spans the slots 40 and 42 to provide a radial opening disposed between the coil conductors spanning these slots.

Figure 4:
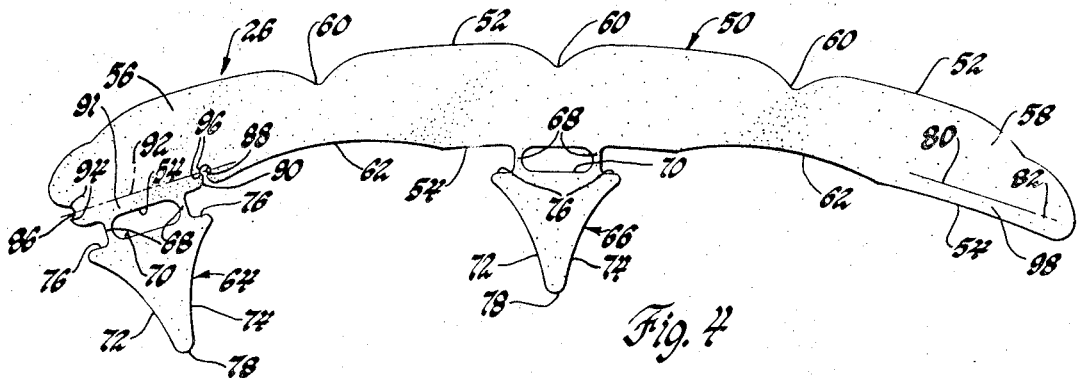
FIG. 4 is an elevational view of one embodiment of an end turn insulator of the present invention.

In FIG. 4, there is illustrated the end turn insulator 26 of one preferred embodiment. The end turn insulator 26 is made from a stamping of a thin sheet of flexible insulation material such as Mylar having a thickness of approximately 0.010 inch. An elongated insulator body 50 is provided including an upper side edge 52 and a lower side edge 54 and body ends 56 and 58. The upper side edge 52 is generally arcuately-shaped and is referred to hereinafter as the outer edge since it is intended to be disposed toward the outer axial portion of the end turns 22 and 24. Three cutout portions 60 substantially equally spaced from each other and from the body ends 56 and 58 are provided in the outer edge 52. These cutout portions approximate the profile of the radial sides of the end turns 22 and 24 when the end turn insulator 26 is assembled between the end turns. The lower side edge 54, referred to hereinafter as the inner edge because it is intended to be disposed toward the stator end, is also arcuately shaped and includes a pair of elongated arcuate cutout portions 62. The arcuate shapes of outer edge 52, inner edge 54, and the cutout portions 62 prevent buckling of the sides of the body 50 when it is formed in a circular collar shape and then assembled inside of the end turns 22. The curved sides of the collar are slightly inclined so as to generally define a truncated cone with outer edge 52 forming the base or end having the larger diameter.

Two locking tabs 64 and 66 are attached by a pair of spaced narrow strips 68 connected to the inner edge 54 of the body portion 50. The locking tab 64 is located at the body end 56 and the locking tab 66 is located generally equally distant between the body ends 56 and 58. Accordingly, the locking tabs 64 and 66 are substantially diametrically disposed when the ends 56 and 58 are overlapped to form the circular collar shape illustrated in FIG. 5. The locking tabs are bendable along the pair of strips 68 and the strips are breakable for detaching the locking tabs from the body 50.

The locking tabs 64 and 66 are triangularly-shaped and include a base side 70 and converging sides 72 and 74. The spaced strips 68 extend from the base side 70 and are intermediate the ends thereof so as to define a pair of opposite shoulders 76. The base side 70 has a predetermined width which enables the locking tabs 64 and 66 to be inserted in the aforementioned radial openings at the ends of the stator. Also, the width of the base side 70 is such that the shoulders 76 will overhang a portion of the entering and exiting conductors 44 and 46 on either side of the radial opening as illustrated in FIG. 2. The length of the spaced strips 68 permits the shoulders 76 of the base side 70 to be radially disposed so that they are engaged by the outer sides of the conductors 44 and 46. The locking tabs are prevented from being removed by the conductors 44 and 46 when the insulator body 50 is mounted against the inner diameter 28 of the end turns 22.

The converging sides 72 and 74 extend from the ends of the base side 70 and intersect at an outer end 78 of each locking tab. The distance between the tab end 78 and base side 70 determines a height of the locking tabs which permits the locking tabs to be pulled radially from behind the end turns 22 and beyond the outer diameter thereof.

Figure 5:
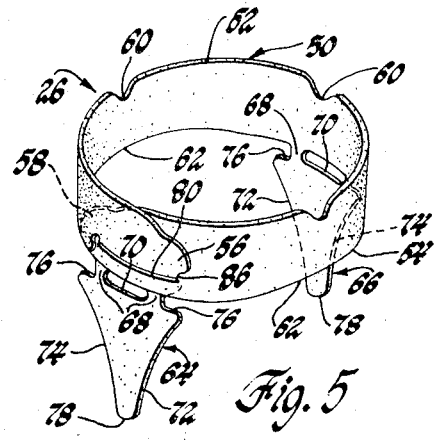
FIG. 5 is a perspective view of the end turn insulator illustrated in FIG. 4 as it is assembled for mounting to a stator assembly.
Figure 6:
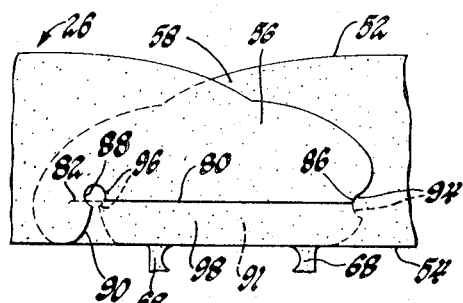
FIG. 6 is a partial plan view of the assembled end turn insulator of FIG 5 illustrating the interlocking of the ends of the insulator.

Referring further to the insulator body 50, the body ends 56 and 58 include complementary-shaped portions which provide an interlocking arrangement illustrated in FIGS. 5 and 6. An elongated opening which is closed at both ends is provided by slit 80 in the body end 58 extending substantially parallel to the inner edge 54. Perforations 82 extend from one end of the slit 80 toward the end edge of the body end 58 to permit the slit to be enlarged. The length of the slit 80 is approximately equal to the width of the base side 70 of the locking tab 64 so that it can be inserted therethrough to facilitate interlocking of the body ends.

The body end 56 includes a semicircular notch opening 86 formed at the end edge thereof and a hole opening 88 which is spaced from the notch 86 at a distance equal to the length of the slit 80. The notch 86 and hole 88 are aligned and spaced from the inner side 54 by approximately the same distance as is the slit 80. A short notch opening 90 extends from the lower edge of the hole 88 and through the inner edge 54. This forms a flap section 91 in the body end below an axis line 92 extending through the centers of the notch 86 and the hole 88. The flap section 91 is inserted through the slit 80 as described hereinbelow. A first pair of opposing lips 94 are formed by the notch 86 in the body end 56 above and below the axis line 92 of the notch 86. A second pair of opposing lips 96 are formed on the left side of the hole 88, as viewed in FIG. 4, above and below the axis 92.

To assemble the end turn insulator 26 into circular collar as shown in FIG. 5, the body ends 56 and 58 are brought together and they are interlocked in accordance with the arrangement shown in FIG. 6. First, the locking tab 64 is inserted through slit 80 and toward the inner edge 54 of the body end 58. The tab passes behind an area 98 of the body end 58 which is between the slit 80 and the inner edge 54. The flap section 91 is then inserted behind the area 98 so that the lower lip of the opposing lips 94 is positioned behind and below the right end of the slit 80, as illustrated in FIGS. 5 and 6. The lower lip of the opposing lips 96 is inserted behind and below the left end of the slit 80. To insert the latter lip, the right side of the notch opening 90 is inserted behind the left end of the slit 80. Adjacent sides of the notch opening 90 are disposed on opposite sides of the body end 58 below the left end of the slit.

The section of the body end 56 along the axis 92 is then aligned with the slit 80 so that the pairs of opposing lips 94 and 96 extend axially beyond the ends of the slit 80. The upper lips of the pairs of opposing lips 94 and 96 will be on the outer side of the body end 58 while the lower lips will be behind the body end 58. This interlocks the body ends 56 and 58 together and they are prevented from separating by pairs of opposing lips 94 and 96.

When the circular collar shape is formed in the insulator body 50 as described above, it includes a diameter which is substantially equal to or slightly larger than the inner diameter 28 of the end turns 22. Also, the diametrically disposed locking tabs 64 and 66 will be circumferentially spaced so as to align with the diametrically disposed radially openings formed by the main winding end turns 22 extending over both of the pairs of vacant slots 30 and 32 prior to the assembly of the starting windings 16.

Assembly of the end turn insulator 26 to the end turns 22 and the stator core 10 is made after the insulator body 50 is formed in a circular collar shape and the ends 56 and 58 are interlocked as shown in FIGS. 5 and 6. The locking tabs 64 and 66 are bent radially outward along the strips 68 as they are inserted through the radial openings adjacent the ends of the vacant pairs of slots 30 and 32. The ends of the tab base side 70 must be bowed slightly so as to clear the edges of the entering and exiting conductors 44 and 46 of coils spanning the slots 36 and 38. After insertion behind the coil end turn 34, the shoulders 76 of the base side 70 will spring back due to the resiliency of the sheet insulation material and overlap a portion of the outside diameter of the end turns 22 formed by coil end turn 34. The entering and exiting conductors 44 and 46 extending from the ends of the slots 36 and 38 engage the shoulders 76 to prevent the locking tabs from being withdrawn through the radial openings. Accordingly, the insulator body 50 is held against the inner diameter 28 of the end turns 22 and is prevented from being pulled away from the stator core 10.

The locking tabs 64 and 66 being positioned as described above, retain the insulator body 50 so that the circular collar shape extends coaxially with the end of the stator core 10 and completely covers the inner diameter 28 of the end turns 22. The inner edge 54 of the insulator body 50 will abut the end of the stator core to prevent axial movement in a direction toward the stator. When the diameter of the circular collar formed by the insulator body 50 is slightly larger than the inner diameter 28 of the end turns 22 a further wedging force is provided to maintain the insulator body 50 in place. The pairs of strips 68 will be located with the radial openings formed by the end turns and adjacent the entering and exiting conductors 44 and 46 to further reduce possible rotational or lateral movement of the insulator body 50 relative to the end turns 22.

The phase winding 16 is then assembled to the pairs of slots 30 and 32 and the slots adjacent thereto as described hereinabove so that the second group of end turns 24 are formed thereby. The end turns 22 and 24, being radially disposed to each other, are separated by the insulator body 50. Accordingly, the outer diameter 29 of the end turns 24 is insulated from the inner diameter 28 of the end turns 22.

During assembly of the phase windings 16, the coils forming both windings are forced radially outward to pack them into the stator slots 12. This causes some spreading apart of the body ends 56 and 58 of the insulator body 50. This spreading is permitted without damaging the integrity of the insulator body 50 by the edge of hole 88 being forced against the end of the slit 80 having the perforations 82. A controlled tearing results along the perforations so the body ends 56 and 58 can assume a position which provides a slightly larger collar diameter in the insulator body 50.

As shown in FIG. 3, the insulator body 50 is clamped between the winding end turns 22 and 24 to further hold the end turn insulator 26 in place. In final assembly of the end turns 22 and 24, a lacing cord, not shown, is normally employed to tie the end turns together. After the end turn assemblies are completed, the locking tabs 64 and 66 are separated from the insulator body 50 by tearing the strips 68 as indicated by the lower position of the locking tab 66 shown in phantom lines in FIG. 1.

Figure 7:
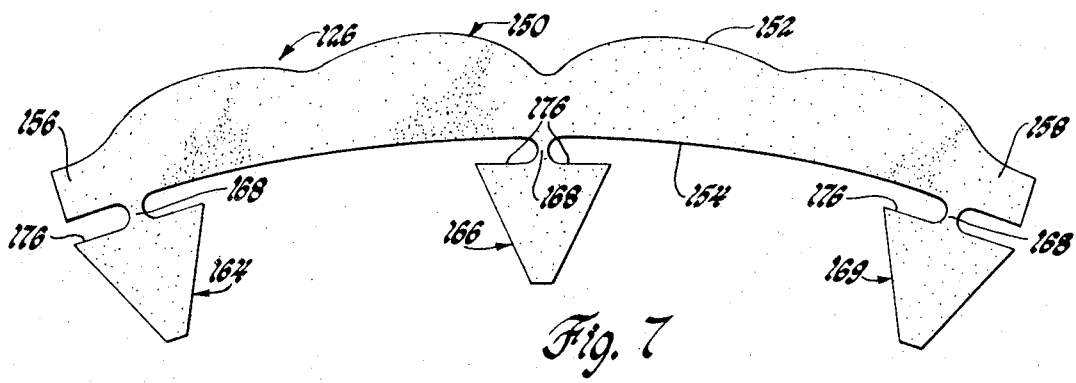
FIG. 7 is an elevational view of another embodiment of an end turn insulator of the present invention.
Figure 8:
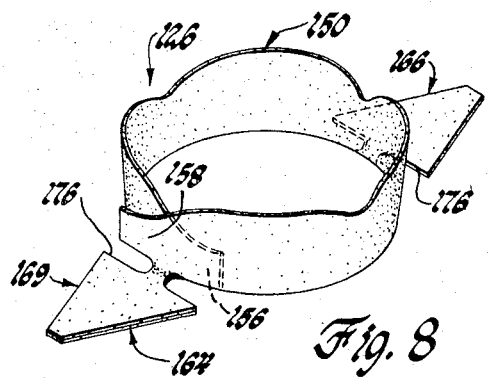
FIG. 8 is a perspective view of the end turn insulator of FIG. 7 assembled for mounting and with the locking tabs bend radially outward.

Another embodiment of a winding end turn insulator 126 made in accordance with this invention is illustrated in FIGS. 7 and 8. A stamping of a thin sheet of flexible insulation material includes an elongated insulator body 150 which has an outer edge 152 and an inner edge 154 and body ends 156 and 158. The edges 152 and 154 are generally arcuate and approximately correspond to the outer and inner edges 52 and 54, respectively, of the end turn insulator 26. Three triangularly-shaped locking tabs 164, 166 and 169 are provided and each is connected to the inner edge 154 by a single narrow strip 168. The locking tabs 164 and 169 are disposed adjacent body ends 156 and 158, respectively, and the locking tab 166 is disposed at the center of the body 150. The insulator body 150 has body ends 156 and 158 which are brought together and overlapped when the end turn insulator 126 is formed in a circular collar shape as shown in FIG. 8. Shoulder 176 are formed on the base sides of the locking tabs corresponding to the shoulders 76 of end turn insulator 26.

The locking tabs 164, 166 and 169 have substantially the same height and width as the locking tabs 64 and 66. The locking tab 169 overlaps the locking tab 164 and is aligned therewith as shown in FIG. 8 to form the body 150 in a circular collar. The locking tab 166 will be disposed substantially diametrically opposite the overlapping locking tabs 164 and 169 in the same manner as the locking tabs 64 and 66 are diametrically disposed when the end turn insulator 26 is formed in a circular collar. It is necessary to manually hold or temporarily clip the body ends 156 and 158 together prior to assembly to the end turns 22 since they are not interlocked as is the end turn insulator 26.

In mounting the insulator body 150 to the inner diameter 28 of the end turns 22, the locking tabs 164, 166 and 169 are bent radially outward, as shown in FIG. 8 and are inserted through the radial openings between the end turns 22 and the stator core end as described hereinabove for locking tabs 64 and 66. The body ends 156 and 158 are substantially fixed together by the shoulders 176 of each of the locking tabs 164 and 169 being engaged by the same conductors of the coil end turn 34 as the shoulders 76 of the locking tab 64 are engaged in FIG. 2. This secures the body ends 156 and 158 to maintain a predetermined diameter for the body 150. When the diameter of the insulator body 150 expands by the windings being forced radially into the stator slots 12, the body ends 156 and 158 and locking tabs 164 and 169 slide over the surfaces of each other. Following final assembly of the end turns 22 and 24 the locking tabs 164, 166 and 169 can be pulled away by breaking the strips 168 in the manner described for the locking tab 66.

It can be seen that since the end turn insulator of this invention is mounted external to a stator core 10, it is easily mounted to a stator core and can be used on different stator cores including the same laminations but different stack heights. Also, since the end turn insulator is secured in place without requiring space within the stator slots additional conductors can be included in the coils forming the windings to provide a more efficient stator assembly.

Although the end turn insulator of this invention is described in connection with a two-pole motor it is to be understood that locking tabs can be provided on the insulator body in spaced relationship to accommodate motors having more than two poles. Also, the general shape of the insulator body and locking tabs can be varied from those described hereinabove without departing from the inventive features of the end turn insulator of this invention. Further, in some applications it may be desirable that the locking tabs are detached and in such instances they would remain connected with the insulator body after final assembly of the stator core utilizing the insulator.

While the embodiments of the present invention herein described constitute preferred forms, it is to be understood that other forms may be adopted without departing from the spirit of this invention.

I claim:

1. An end turn insulator for a stator assembly of a dynamoelectric machine including a stator core having axially extending and circumferentially spaced slots, said slots including first and second windings arranged therein which form first and second groups of radially disposed end turns extending axially from the ends of said stator core, said end turn insulator comprising: an elongated insulator body formed of a single sheet of flexible insulation material including oppositely disposed end portions, said end portions having a predetermined overlapping position to form said insulator body in a circular collar to provide an insulating barrier extending axially between adjacent sides of said first and second groups of end turns; and a locking tab means detachably connected to a side edge of said insulator body, said locking tab means including a base side spaced from said side edge and having shoulder portions disposed adjacent said side edge, said locking tab means bending radially outward and being insertable between said first group of end turns and said end of said stator core whereby said shoulder portions extend radially adjacent an outer diameter portion of said first group of end turns and are engaged thereby for aligning and attaching said insulator body to said first group of end turns prior to the assembly of said second winding to said stator core.

2. An end turn insulator for a stator assembly of a dynamoelectric machine including a stator core having axially extending and circumferentially spaced slots, said slots receiving conductors forming first and second windings respectively including first and second groups of radially disposed end turns extending axially from the ends of said stator core, and wherein predetermined slots are left vacant from the conductors of said first windings so that circumferentially-spaced radial openings are formed between said ends of said stator core and said first group of end turns prior to the assembly of said conductors to said slots for forming said second winding, said end turn insulator comprising: an elongated insulator body formed of a single sheet of flexible insulation material including oppositely disposed end portions, said end portions having a predetermined overlapping position to form said insulator body in a circular collar for covering adjacent sides of said first and second groups of end turns; a plurality of triangularly-shaped locking tabs; and a plurality of narrow strips connecting each of said locking tabs to one side edge of said insulator body, each of said locking tabs including a base side spaced from said one side edge by said narrow strips and having shoulder portions formed on opposite sides of said narrow strips, said plurality of locking tabs being circumferentially spaced around said circular collar in alignment with said circumferentially-spaced radial openings, and said plurality of locking tabs bending radially outward along said plurality of narrow strips and being insertable through said circumferentially-spaced radial openings whereby said shoulder portions extend radially outside of an outer diameter portion of said first group of end turns and are engaged thereby for retaining said insulator body on said first group of end turns.

3. An end turn insulator for a dynamoelectric machine having a stator core including axially extending slots receiving first and second field windings forming first and second groups of end turns extending axially from the ends of said stator core wherein said first group of end turns is disposed radially outwardly and adjacent said second group of end turns, said end turn insulator comprising: an elongated insulator body made of a thin sheet of insulation material and including opposite end portions; and three-spaced locking tabs connected by narrow strip portions to a side edge of said insulator body, two of said locking tabs being disposed adjacent said opposite end portions respectively with a third locking tab being disposed therebetween, said opposite end portions having a predetermined overlapping position to form said insulator body in a circular collar whereby said two locking tabs are mutually overlapping, said circular collar including a predetermined diameter to provide insulating covering of the inner diameter of said first group of end turns when said side edge of said insulator body is disposed adjacent the stator end, sand said locking tabs being bendable along said narrow strip portions and radially insertable between said first group of end turns and an end of said stator core at circumferentially-spaced locations thereof whereby said shoulder portions overhang an outer diameter portion of said first group of end turns and are engaged thereby to align and retain said insulator body against the inner diameter of said first group of end turns and to retain said opposite end portions in said predetermined overlapping relationship.

4. An end turn insulator for a stator assembly of a dynamoelectric machine including a stator core having axially extending and circumferentially-spaced slots receiving a first field winding with preselected slots being left vacant to form circumferentially-spaced radial openings adjacent the ends of the vacant slots and between the stator core and a first group of end turns formed by said first field winding, and said spaced slots further receiving a second field winding which forms a second group of end turns disposed radially inwardly of said first group of end turns, said end turn insulator comprising: an elongated insulator body made of a thin sheet of insulation material and including opposite end portions, said opposite end portions having a predetermined overlapping position to form said insulator body in a circular collar which provides an insulating barrier when mounted between said first and second groups of end turns; at least two locking tabs having a base side disposed adjacent to a side edge of said insulator body; two pairs of spaced strips connecting the base sides of each of said locking tabs to said side edge so that said first and second locking tabs are aligned with two of said circumferentially-spaced radial openings when said body is formed in a circular collar, and said pairs of spaced strips being disposed intermediate the ends of said base sides of said locking tabs so as to define shoulder portions at opposite ends of said base sides; means for interlocking said opposite ends in said predetermined overlapping position including an elongated closed opening formed in one of said opposite end portions and a flap portion formed in the other of said end portions which is insertable through said elongated closed opening, said locking tabs being bendable along said pairs of spaced strips so as to extend radially outwardly from the ends of said circumferentially-spaced radial openings when said circular collar formed by said body covers the inner diameter of said first group of end turns and said paris of spaced strips are disposed within said circumferentially-spaced radial openings so that said shoulder portions of said locking tabs are engaged by an outer diameter portion of said first group of end turns prior to the assembly of said second winding, and said locking tabs being detachable by breaking along said spaced strips following assembly of said second winding in the spaced slots of said stator core.

5. An end turn insulator for a stator assembly of a dynamoelectric machine including a stator core having axially extending and circumferentially-spaced slots receiving a first field winding with preselected slots being left vacant to form circumferentially-spaced radial openings adjacent the ends of the vacant slots and between the stator core and a first group of end turns formed by said first field winding, and said spaced slots further receiving a second filed winding which forms a second group of end turns disposed radially inwardly of said first group of end turns, said end turn insulator comprising: an elongated insulator body made of a thin sheet of insulation material and including opposite end portions, said opposite end portions having a predetermined overlapping position to form said insulator body in a circular collar which provides an insulating barrier when mounted between said first and second groups of end turns; first and second triangularly-shaped locking tabs having a base side disposed adjacent a side edge of said insulator body wherein said first locking tab is disposed adjacent one of said end portions; two pairs of spaced strips connecting the base sides of each of said first and second locking tabs to said side edge so that said first and second locking tabs are aligned with a pair of said radial openings when said body is formed in a circular collar, and said pairs of spaced strips being disposed intermediate the ends of said base sides of said first and second locking tabs so as to define shoulder portions on opposite sides of the spaced strips; means for interlocking said opposite ends in said predetermined overlapping position including a closed slit opening having perforations extending from one end thereof formed in the other of said opposite end portions and a flap portion formed in said one end portion, said first locking tab extending from said flap portion so that both are insertable through said closed slit opening, said closed slit opening extending substantially parallel to said side edge of said body and said flap portion being formed by two laterally-spaced openings disposed along an axis line extending substantially parallel to said side edge and including pairs of opposing lip portions formed on each of said laterally-spaced openings whereby said flap portion is bendable along said axis line for facilitating insertion of said first locking tab and said flap portion through said closed slit opening to position said opposing lip portions of each of said laterally-spaced openings at the ends of said closed slit opening, said locking tabs being bendable along said pairs of spaced strips to extend radially outwardly for insertion through said circumferentially-spaced radial openings when said circular collar formed by said body covers the inner diameter of said first group of end turns and said pairs of spaced strips are disposed within said circumferentially-spaced radial openings so that said shoulder portions of said locking tabs are engaged by an outer diameter portion of said first group of end turns prior to the assembly of said second winding, and said locking tabs being detachable by breaking along said spaced strips following assembly of said second winding in the spaced slots of said stator core.